(12) United States Patent
Karabelas et al.

(10) Patent No.: US 10,421,045 B2
(45) Date of Patent: Sep. 24, 2019

(54) MEMBRANE MODULES UTILIZING INNOVATIVE GEOMETRIES OF NET-TYPE FEED SPACERS FOR IMPROVED PERFORMANCE IN SEPARATIONS AND SPACER-FABRICATION METHODS THEREIN

(71) Applicant: Center for Research and Technology-Hellas (CERTH), Thermi Thessaloniki (GR)

(72) Inventors: Anastasios I. Karabelas, Salonika (GR); Chrysafenia P. Koutsou, Salonika (GR)

(73) Assignee: CENTER FOR RESEARCH AND TECHNOLOGY-HELLAS (CERTH), Thermi Thessaloniki (GR)

( * ) Notice: Subject to any disclaimer, the term of this patent is extended or adjusted under 35 U.S.C. 154(b) by 486 days.

(21) Appl. No.: 14/945,568

(22) Filed: Nov. 19, 2015

(65) Prior Publication Data
US 2016/0151745 A1    Jun. 2, 2016

(30) Foreign Application Priority Data
Dec. 2, 2014   (GR) .............................. 20140100613

(51) Int. Cl.
*B01D 63/10* (2006.01)
*B01D 65/00* (2006.01)
(Continued)

(52) U.S. Cl.
CPC .......... *B01D 63/103* (2013.01); *B01D 63/10* (2013.01); *B01D 65/08* (2013.01); *B01D 67/002* (2013.01);
(Continued)

(58) Field of Classification Search
CPC .............. B01D 2313/143; B01D 63/10; B01D 63/103; B01D 65/08; B01D 67/002;
(Continued)

(56) References Cited

U.S. PATENT DOCUMENTS

| | | | |
|---|---|---|---|
| 3,067,084 A | 12/1962 | Nalle, Jr. | |
| 3,700,521 A | 10/1972 | Gaffney | |

(Continued)

FOREIGN PATENT DOCUMENTS

JP    2009 034148 A    2/2009

OTHER PUBLICATIONS

C.P. Koutsou, et al, Direct numerical simulation of flow in spacer-filled Channels: Effect of Spacer geometrical characteristics, Journal of Membrane Science 291 (2007) 53-69.

(Continued)

*Primary Examiner* — John Kim
(74) *Attorney, Agent, or Firm* — Reuven K. Mouallem; FlashPoint IP Ltd.

(57) ABSTRACT

The present invention discloses membrane modules utilizing innovative geometries of net-type feed spacers for improved performance in separations and spacer-fabrication methods therein. Membrane modules include: a central tube having perforations along its length for collecting a permeate; at least two filtration envelopes, each filtration envelope having two membrane sheets and a porous, fabric-type insert in between the two membrane sheets for facilitating the permeate to flow, wherein each envelope is closed along three edges of the two membrane sheets, and wherein each envelope is configured to allow the permeate to exit from a fourth, open edge attached to the central tube; and a respective feed-spacer sheet in planar contact with an outer membrane surface of a respective filtration envelope; wherein the respective feed-spacer sheet is in the form of net having (Continued)

nodes connected by flexible segments such that the net forms a regular planar net.

8 Claims, 11 Drawing Sheets

(51) Int. Cl.
    *B01D 67/00*     (2006.01)
    *B01D 65/08*     (2006.01)
    *B29C 45/26*     (2006.01)
    *B29C 33/42*     (2006.01)
    *B29D 28/00*     (2006.01)
    *B29C 47/00*     (2006.01)
    *B29C 43/36*     (2006.01)
    *B29C 45/00*     (2006.01)
    *B29L 28/00*     (2006.01)

(52) U.S. Cl.
    CPC ............ *B29C 33/42* (2013.01); *B29C 45/263* (2013.01); *B01D 2313/143* (2013.01); *B29C 43/36* (2013.01); *B29C 45/00* (2013.01); *B29C 47/004* (2013.01); *B29C 47/0021* (2013.01); *B29C 47/0033* (2013.01); *B29D 28/00* (2013.01); *B29L 2028/00* (2013.01)

(58) Field of Classification Search
    CPC ......... B29C 33/42; B29C 43/36; B29C 45/00; B29C 45/263; B29C 47/0021; B29C 47/0033; B29C 47/004; B29D 28/00; B29L 2028/00
    See application file for complete search history.

(56) References Cited

U.S. PATENT DOCUMENTS

| | | |
|---|---|---|
| 3,957,565 A | 5/1976 | Livingston et al. |
| 5,419,695 A | 5/1995 | Clegg |
| 6,881,336 B2 | 4/2005 | Johnson |
| 6,989,097 B2 | 1/2006 | Karode et al. |
| 2003/0205520 A1 | 11/2003 | Johnson |
| 2014/0059952 A1 | 3/2014 | Christandl |

OTHER PUBLICATIONS

C.P. Koutsou, et al, A numerical and experimental study of mass transfer in spacer-filled channels: Effect of Spacer geometrical characterisics and Schmidt number, Journal of Membrane Science 326 (2009) 234-251.

C.P. Koutsou, et al, Towards optimization of spacer geometrical characteristics for spiral wound membrane modules, Desalination and Water Treatment 18 (2010) 139-150.

G.A. Fimbres-Weihs, et al, Review of 3D CFD modeling of flow and mass transfer in narrow spacer-filled channels in membrane modules, Chemical Engineering and Processing 49 (2010) 759-781.

G. Schock, et al, Mass transfer and pressure loss in spiral wound modules, Elsevier Science Publishers B.V., Amsterdam, Desalination, 64 (1987) 339-252.

R. Semiat, Energy Issues in Desalination Processes, American Chemical Society, Environmental Science & Technology (2008) vol. 42, No. 22. p. 8193-8201.

Koutsou C. P. et al: "A numerical and experimental study of mass transfer in spacer-filled channels: Effects of spacer geometrical characteristics and Schmidt number", Journal of Membrane Science, Elsevier BV, NL, vol. 326, No. 1, Jan. 5, 2009, pp. 234-251, XP025710643, ISSN: 0376-7388, DOI: 10.1016/J.Memsci.2008.10. 007 (see figure 2: table 1).

Jon Johnson & Markus Busch (2010), Engineering Aspects of Reverse Osmosis Module Design, Desalination and Water Treatment, 15: 1-3, 236-248 http://dx.doi.org/10.5004/dwt.2010.1756.

MEMBRANE MODULES UTILIZING INNOVATIVE GEOMETRIES OF NET-TYPE FEED SPACERS FOR IMPROVED PERFORMANCE IN SEPARATIONS AND SPACER-FABRICATION METHODS THEREIN

CROSS REFERENCE TO RELATED APPLICATIONS

This patent application claims priority to Greek Patent Application No. 20140100613, filed Dec. 2, 2014, which is hereby incorporated by reference in its entirety.

FIELD AND BACKGROUND OF THE INVENTION

The present invention relates to membrane modules utilizing innovative geometries of net-type feed spacers for improved performance in separations and spacer-fabrication methods therein. Such improved geometric configurations of net-type feed spacer sheets, which are essential components of spiral-wound membrane (SWM) modules, critically affect the performance of SWM modules, which are employed in water purification, water desalination, and other liquid-separation processes.

Pressure-driven membrane technology is widely applied for the purpose of water purification from dissolved or suspended salts, colloids, organic molecules, and other undesirable species. Such membrane technology has also been applied to other types of liquid purification in which the undesirable species are removed by taking advantage of physicochemical properties of particular membranes. According to the physicochemical characteristics (e.g., size, polarity, charge) of the species which need to be separated, various types of membranes are used which (in order of increasing pore size) are commonly classified as reverse osmosis (RO), nanofiltration (NF), ultrafiltration (UF), and microfiltration (MF) membranes. RO and NF membranes are usually employed as the final step in water desalination for removal of ionic and other dissolved species. Whereas, UF and MF membranes are utilized for fluid pretreatment and removal of the largest proportion of dispersed colloids, macro-molecules, and other (relatively large-size) species in processes of liquid purification or recovery of valuable products, either in the retentate stream or the liquid permeate.

In another category of new membrane methods (referred to as osmotic separations), the osmotic pressure difference between the treated aqueous (or other) solution and another liquid is exploited to separate the two liquids using a semi-permeable membrane. Employing the osmotic pressure difference between the two liquids and the concentration of solutions as the driving force, various separations can be achieved without applying pressure.

To implement membrane-based water treatment and similar separation processes, special modules are commonly used, which are comprised of flat-sheet membranes. For the typical case of water treatment and desalination with RO and NF membranes, the so-called spiral wound membrane (SWM) module is employed (henceforth referred to as an "SWM module" or "SWM element").

Referring to the drawings, FIG. 1 is a simplified perspective diagram of a typical SWM module having a standard mesh-type spacer used in water desalination and membrane water treatment/separation, according to the prior art. Two membrane sheets 2, which are closed (or glued) along three sides/edges with the fourth side/edge open (enveloping a fabric-type insert to facilitate permeate flow), and properly attached to a central perforated tube 4, form an "envelope." Central perforated tube 4 receives the out-flowing permeate along a transverse direction 3. Feed liquid flows axially (as in feed flow 5) through narrow channels which are formed from a usually-polymeric, mesh-type spacer 1 placed in between two adjacent envelopes. Due to the applied pressure on the feed liquid-side (or/and because of the osmotic pressure difference), permeate passes through semi-permeable membrane 2, and flows in transverse direction 3 with respect to axial feed flow 5, through the permeate channel toward central perforated tube 4 along the axis of the SWM module from where the permeate is removed as the purified product. As the feed liquid flows axially (as in feed flow 5) to the exit of the SWM element, permeate removal causes a reduction in volume, and the concentration of rejected salts and foulants tend to increase. Consequently, the purified product is often called "concentrate," and possesses increased osmotic pressure in comparison to the initial feed liquid to be desalinated.

Two basic problems related to the aforementioned membrane operation, which are significantly affected by the feed-spacer geometry, are concentration polarization (CP) and membrane fouling (MF). CP is the result of the development of the concentration boundary-layer (from the rejected salts) at the membrane surface in which the concentration of ionic species is significantly greater than in the liquid bulk; therefore, the osmotic pressure at the membrane surface is much greater than that corresponding to the fluid bulk concentration. Such an increase in osmotic pressure at the membrane surface reduces the effective trans-membrane pressure, resulting in a negative impact on separation performance (i.e., leading to reduced permeate flux), as well as on energy expenditure and the economics of the membrane process (see R. Semiat, *Environ. Sci. Technol.*, 42(22), 8193-8201 (2008)).

It is noted that the effective trans-membrane pressure is obtained from the pressure difference between the retentate and permeate channels minus the osmotic pressure difference between those channels. CP also results in reduced salt rejection of the membrane, which negatively affects the permeate quality. The problem of MF by the rejected species (e.g., colloids and organic molecules) is due to the formation of a layer comprising these species, which is rather firmly attached to the membrane surface. Such a layer tends to significantly increase the resistance to the permeate flow, enhance CP, and reduce the effective transmembrane pressure, leading to overall deterioration of membrane separation performance—both qualitatively and quantitatively.

The inevitable use of spacers for the creation of the feed-water channels, while possibly intensifying in part the aforementioned pressure-drop and fouling, could also serve to mitigate CP and MF as outlined in research by Koutsou et al. (see *J. Membrane Sci.*, 291, 53-69 (2007)). The work of Koutsou et al. has proven that, even at relatively low flow rates, spacers can promote fluid-dynamic instabilities and turbulence development, as well as increased flow shear-stresses at the membrane surface, which lead to mitigation of CP and MF phenomena. At the same time, spacers are responsible for a pressure-drop increase at the feed-water channels in comparison to the ideal case of spacer-free channel flow.

Presently, spacers of the net-type configuration are widely-used, and are generally quite thin, with thickness (depending on the application of the membrane module) varying from 0.6 mm to 1.2 mm (see Schock and Miguel in

*Desalination*, 64, 339-352 (1987)). Returning to FIG. 1, spacers 1 are placed in between neighboring envelopes, which are formed by two membrane sheets 2 (sealed together on three sides), creating the necessary gap for the feed-water flow (axial feed flow 5). Moreover, spacers, depending on their detailed geometrical characteristics, tend to create flow instability (e.g., generating vortices), and increase flow shear-stresses at the membrane surface, resulting in reduction of CP and possibly mitigation of MF which negatively affect the separation performance. Therefore, with the appropriate geometrical spacer-configuration, it is possible to improve overall SWM-module performance through the aforementioned mechanisms and increased mass-transfer coefficients at the membrane surface.

The inherent disadvantages of feed-spacers, which are currently used in commercial membrane modules, are due to their presence in the narrow feed-water channels, which promote the creation of dead-flow zones (which enhance fouling), and cause enhancement of the pressure drop (i.e., energy consumption), resulting in increased process operating cost. Therefore, in the past two decades (see Fimbres-Weihs and Wiley in *J. Membrane Sci.*, 326, 234-251 (2009)), the geometrical characteristics of such spacers have been the subject of significant research, aiming at optimization of their geometry, leading to improved SWM-module performance (through increased shear stresses and mass-transfer coefficients) with the lowest possible pressure drop.

FIG. 2 is a simplified perspective diagram of a typical net-type spacer, according to the prior art. Typically, common net-type spacers are formed by two planar rows of parallel (nearly cylindrical) filaments 6 (having diameters varying between ~0.35 mm and ~0.60 mm), which intersect with each other at a given angle, x. In such a configuration, each row of cylindrical filaments 6 (whose axes of symmetry are on the same plane) touches one membrane sheet of the respective feed-water channel. Thus, such a geometry is characterized by flow constriction 7 (i.e., narrow open areas) which are formed between the cylindrical filaments (of one row) and the opposite membrane surface, and by contact lines 8 of the same filaments with the other membrane surface.

Detailed theoretical and experimental research results (see Koutsou et al. cited above and Koutsou et al. in *J. Membrane Sci.*, 326, 234-251 (2009)) show that, in narrow open areas (i.e., flow constrictions 7) between spacer filaments and the membrane surface, the mass-transfer coefficients are significantly increased, which positively affects the performance of the membrane modules. However, at (and near) the contact lines, the corresponding coefficients are almost zero, leading to enhancement of the undesirable phenomena of CP and MF. The latter tend to degrade SWM-module performance, and reduce the membrane lifetime due to frequent chemical cleaning, which usually damages the membrane's active surface.

For optimization of spacer geometric characteristics, care should be taken to balance the counteracting requirements of pressure-drop minimization (which is achieved with thicker spacers, and thus, greater gaps and lower fluid velocities) versus maximization of shear stresses and mass-transfer coefficients (which are achieved by increased fluid velocities and/or thinner spacers). In addition, the work of Koutsou et al. has theoretically and experimentally proven that the detailed spacer geometrical configuration, and its orientation with respect to the direction of the incoming mean flow, affect pressure drop and other significant parameters (i.e., flow shear-stresses at the membrane surface and mass-transfer coefficients). Both of these parameters in turn significantly affect CP and MF.

Presently-used, net-type spacers are fabricated using methods described in detail in U.S. Pat. Nos. 3,700,521; 3,957,565; and 3,067,084. Such production methods are based on extrusion of polymeric material through two concentric circular arrays of dies, arranged on two concentric circles of different diameters. Polymeric material extrusion in the form of filaments takes place at different angle from each circular array of dies so that when the filaments of one array (still in the form of a melt) touch the filaments from the other array, the filaments tend to adhere to each other, forming a tubular biplanar net with the desirable "crossing angle" x of the filaments. In the automatic production process, the ensuing filament, cooling under tension of the net, leads to the final filament-shape formation. Cutting such a tubular net leads to the final planar form of the marketable spacer net.

It would be desirable to have membrane modules utilizing innovative geometries of net-type feed spacers for improved performance in separations and spacer-fabrication methods thereof. Such modules and methods would, inter alia, overcome the various limitations mentioned above.

SUMMARY

It is the purpose of the present invention to provide membrane modules utilizing innovative geometries of net-type feed spacers for improved performance in separations and spacer-fabrication methods therein.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

Embodiments of the present invention enable a novel geometry of net-type spacers as well as methods for its fabrication. The novel spacers are compatible with general SWM-module shape and SWM-module production methodology. However, such spacers are substantially different regarding their detailed geometric features compared to presently-used spacers as well as to those described in U.S. Pat. Nos. 6,881,336 B2 and 6,989,097 B2 and in the scientific/technical literature cited above of Koutsou et al. and Schock & Miguel.

Embodiments of the present invention include spacers having nodes of spherical (as well as nearly-spherical or spheroidal) shape of diameter H, which are symmetrically distributed on a plane so that their centers are on the same plane, and form the apices of parallelograms (not necessarily square). All nodes are connected at four sides with neighboring ones during fabrication by flexible cylindrical or nearly-cylindrical filaments/segments of approximate diameter $D(\leq H/2)$, thus forming a net-type structure.

The symmetry axes of the cylindrical connecting-segments are preferably on the same plane with the centers of the nodes; thus, the net is almost perfectly symmetric. With such a geometric arrangement, the spacers need to contact the membranes only at contact points (or small circular contact areas, corresponding to the nodes), and not along contact lines as with conventional inserts. Therefore, the creation of "dead zones" of zero or reduced flow, prevailing near the contact lines (see Koutsou et al. cited above), is avoided, thereby mitigating the phenomena of CP and MF.

Some embodiments of the present invention include methods for production of a novel spacer using a special mold having two, practically identical, flat slabs. On one surface of each slab, which is essentially the horizontal plane of symmetry of the spacer, precision grooves in the form of narrow channels are engraved corresponding to half the net-type spacer. On the same surface of each slab, special side channels are engraved to facilitate both (1) the injection of a polymer melt (or other type of appropriate material) through some channels, and (2) the removal of air from other channels, thereby helping to totally fill the grooves with polymeric material, and to avoid air-bubble entrapment during injection. Assembly of the two engraved slabs with the necessary precision (in such a manner that each engraved surface is practically the minor image of the other) is facilitated by the use of special "male/female" precision fittings embedded in each slab for mating during assembly.

The two slabs forming the mold are kept at sufficiently high temperatures during the polymer injection, depending on the melting point and other related properties of the injected material. Depending on the size of the mold, appropriate means (e.g., a hydraulic press) are employed to exert pressure on the slabs, thus maintaining a perfect fit, with no molten material leaking outside the engraved channels that form the net. After injection of a polymer melt or other material, the mold is sufficiently cooled, depressurized, and the net removed using techniques known in the art.

Other embodiments of the present invention include methods for production of a novel spacer using a special mold having two cylinders of practically the same diameter with very smooth cylindrical surfaces before engraving the net pattern. On each cylindrical surface, small helical channels are engraved having transverse cross-sectional areas of semi-circular grooves of diameter D (at cylinder surface) corresponding to the diameter of the connecting segments of the spacer. The distance between such parallel, neighboring engraved channels is such that their projection on a flat plane comprises parallel channels with their symmetry axes at a distance, which in one embodiment of the spacer is equal to the side L of an imaginary four-sided net (i.e., parallelogram, not necessarily square)—the unit parallelogram of the novel geometry. At a linear distance L within the engraved channels, semi-spherical cavities are formed having diameter H at the cylinder surface, thereby corresponding to half the spherical node. Such semi-spherical cavities are formed on each cylindrical surface so that the projection of the engraved surface on a plane corresponds exactly (in principle) to the cross-sectional area of the net at its planar symmetry plane.

The helical engravings on both cylindrical surfaces are characterized by exactly (in principle) the same distances between neighboring channels and distances L between the centers of the semi-spherical cavities/nodes. The two cylinders forming the mold are accurately assembled such that when in contact along a line (i.e., corresponding to the cylindrical surface "generator"), both the semi-spherical nodes and the channel-type engravings align to form the nodes and the entire net.

It is noted for clarity that a cylindrical surface is generated by a straight line which moves along a fixed curve (i.e., a circle in the case above), and remains parallel to a fixed straight line. In such a configuration, the fixed curve is called the "directrix" of the surface, and the moving line is called the "generatrix" (or "generator" as described above and hereafter) of the surface.

Therefore, by counter-rotating the two cylinders toward their line of contact, with exactly the same rotational speed, while polymer melt flows on one side along the contact line of the rotating cylinders at an appropriately slow rate, one can obtain the complete net along the other side of the contact line. The finished net as it comes out of the two-cylinder mold is cooled and solidified. Under appropriate tension, the net can be rolled around a reel, forming a marketable product.

Therefore, according to the present invention, there is provided for the first time a spiral-wound membrane (SWM) module, the SWM module including: (a) a central tube having perforations along its length for collecting a permeate; (b) at least two filtration envelopes, each filtration envelope having two membrane sheets and a porous, fabric-type insert in between the two membrane sheets for facilitating the permeate to flow, wherein each envelope is closed along three edges of the two membrane sheets, and wherein each envelope is configured to allow the permeate to exit from a fourth, open edge attached to the central tube; and (c) a respective feed-spacer sheet in planar contact with an outer membrane surface of a respective filtration envelope; wherein the respective feed-spacer sheet is in the form of net having nodes of spherical, nearly-spherical, or spheroidal shape, symmetrically distributed in the net such that node centers of the nodes are on a common plane and neighboring centers of four nearest nodes form apices of a parallelogram, and wherein all the nodes are connected by flexible, cylindrical or nearly-cylindrical segments such that the net forms a regular planar net.

Alternatively, the respective feed-spacer sheet is positioned in between two adjacent filtration envelopes, thereby forming a feed-flow channel such that a main feed-flow direction is along a bisector of the parallelogram.

Alternatively, wherein an angle, defined by the intersection of symmetry axes of two neighboring segments of the feed-spacer sheet, varies between about 30° and 150°.

Most alternatively, wherein the angle has an angle bisector coinciding with a main feed-flow direction.

Alternatively, a node shape of the nodes is approximately spherical or oblate spheroidal.

Alternatively, a segment shape of the segments is such that their cross-section is approximately circular or non-circular.

Alternatively, a ratio of a mean node diameter of the nodes over a mean segment diameter of the segments varies between about 1.5 and 5.0.

Alternatively, a ratio of the distance between the node centers over a mean segment diameter of the segments varies between about 5 and 14.

Alternatively, a ratio of a mean node diameter of the nodes over a mean segment diameter of the segments is equal to about two, and wherein symmetry axes of the segments and of the node centers of the nodes lie substantially on the common plane such that the net is symmetric.

According to the present invention, there is provided for the first time a method of fabricating feed-spacer sheets, the method including the steps of: (a) assembling a mold having two slabs with a practically-identical, engraved net-type pattern on a flat surface of each slab, wherein the engraved net-type pattern forms half of a specific, feed-spacer geometric pattern with respect to a planar symmetry plane, and wherein the step of assembly involves appropriately aligning the two slabs such that the engraved net-type pattern of each surface is in aligned contact for forming the feed-spacer geometric pattern; and (b) injecting an appropriate material, capable of solidification, into the mold to form a feed-spacer sheet.

Alternatively, the mold has channels engraved in sides of the two slabs, wherein the channels are in direct contact with the engraved net-type pattern, and wherein some channels are adapted to facilitate the step of injecting, and other channels are adapted to allow the removal of air from the engraved net-type pattern, thereby avoiding air entrapment in the mold during net fabrication.

Most alternatively, the step of assembly is performed by making special marks, protrusions, and/or fittings on the two slabs for ensuring an appropriate pattern fit, and wherein the marks, protrusions, and/or fittings are adapted to exert pressure on outer surfaces of the two slabs by an appropriate press.

According to the present invention, there is provided for the first time a method of fabricating feed-spacer sheets, the method including the steps of: (a) assembling a mold having two cylinders, with the same diameter and smooth external surfaces, with a practically-identical, engraved, helical net-type pattern on the external surfaces, wherein the engraved net-type pattern forms half of a specific, feed-spacer geometric pattern with respect to a planar symmetry plane, and wherein the step of assembly involves appropriately aligning the two cylinders such that the engraved, helical net-type pattern of each the external surface is in aligned contact for forming the feed-spacer geometric pattern; (b) axially rotating the two cylinders in opposite directions to each other; and (c) filling an appropriate material, capable of solidification, into the mold between the two cylinders to form a feed-spacer sheet.

Alternatively, the step of assembling is performed such that the two cylinders are assembled, with cylinder axes horizontal with respect to the gravitational-field direction, on an appropriate frame and accurately adjusted such that the external surfaces are in contact along a respective generator.

Most alternatively, the step of rotating is performed such that the two cylinders are counter-rotated at a same speed of rotation toward a common contact line, and wherein the step of filling is performed such that the material is fed under a controlled rate on and along a feed-entrance side of the common contact line of the two cylinders, whereby the feed-spacer sheet is obtained at a feed-exit side of the common contact line.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

The present invention relates to membrane modules utilizing innovative geometries of net-type feed spacers for improved performance in separations and spacer-fabrication methods therein. The principles and operation for providing such modules and methods, according to the present invention, may be better understood with reference to the accompanying description and the drawings.

Figure 3:
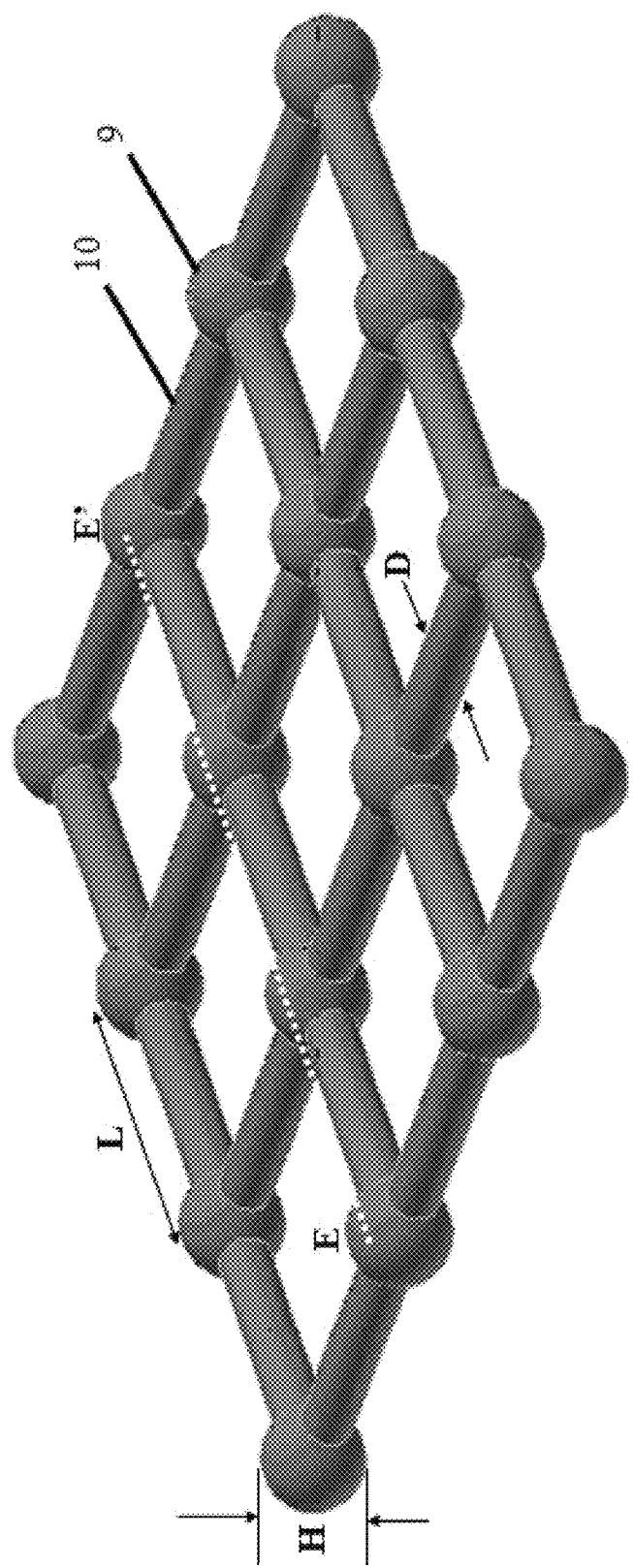
FIG. 3 is a simplified perspective diagram of a novel net spacer, according to embodiments of the present invention.

Referring again to the drawings, FIG. 3 is a simplified perspective diagram of a novel net spacer, according to embodiments of the present invention. The geometric details of the spacer are shown with nodes 9 of spherical or spheroidal shape having a diameter H, which is equal to the gap (or height) of the flow channel for the feed-liquid. Nodes 9 are symmetrically distributed in the mesh-like pattern such that their centers are on the same plane (i.e., the planar plane of symmetry of the spacer), and form the apices of parallelograms. Nodes 9 are connected during production with flexible cylindrical or nearly-cylindrical segments/filaments 10 of length L and diameter D. In some embodiments, D has a range up to half the node diameter (i.e., ≤H/2) of nodes 9 so that a regular net is formed. Nodes 9 and cylindrical filaments 10 are aligned along lines depicted as E-E'.

Figure 4:
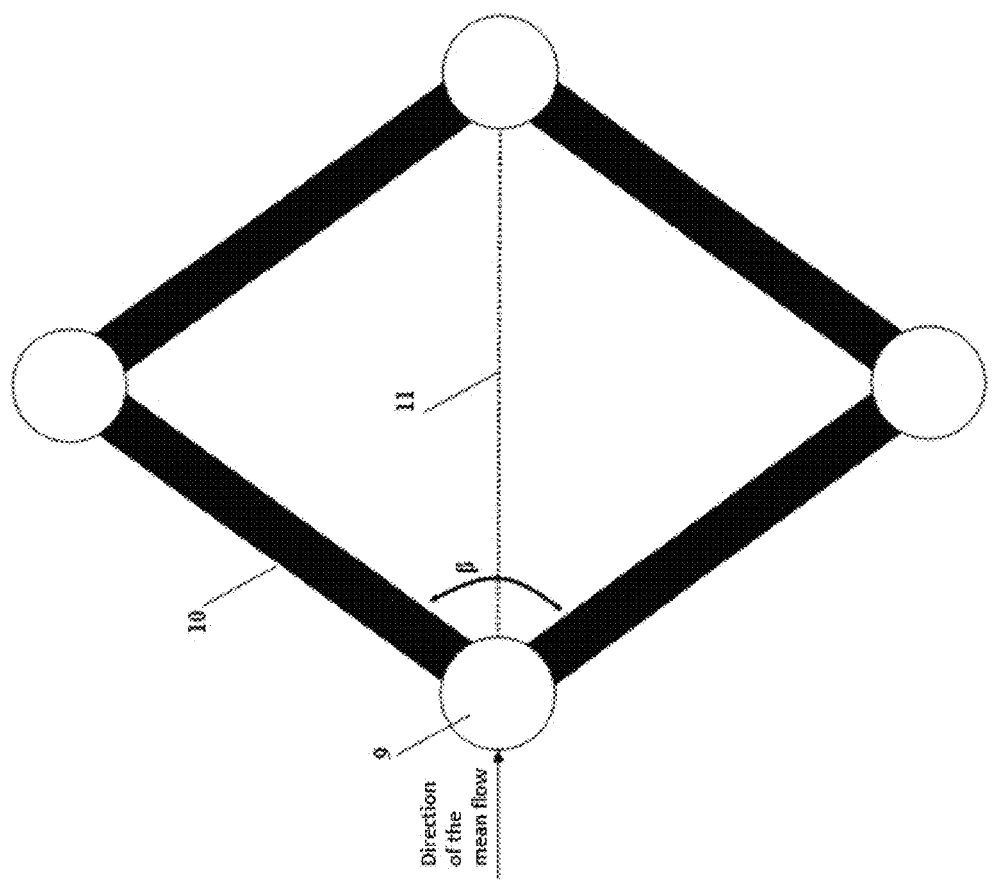
FIG. 4 is a simplified top view of the geometrical configuration of the net spacer of FIG. 3, according to embodiments of the present invention.

FIG. 4 is a simplified top view of the geometrical configuration of the net spacer of FIG. 3, according to embodiments of the present invention. The symmetry axes of connecting segments 10 form equilateral parallelograms with an obtuse angle β. The unit parallelograms (or "cells" of the mesh) shown in FIG. 4 can be square or have a non-orthogonal geometry with "crossing" angle β which may vary over a fairly large range of values. A diagonal 11 of the unit parallelogram is also depicted. In typical applications, in SWM RO and NF modules, the β values can vary between about 30° and 150°, depending on the intended purpose of the particular water treatment.

Figure 5:
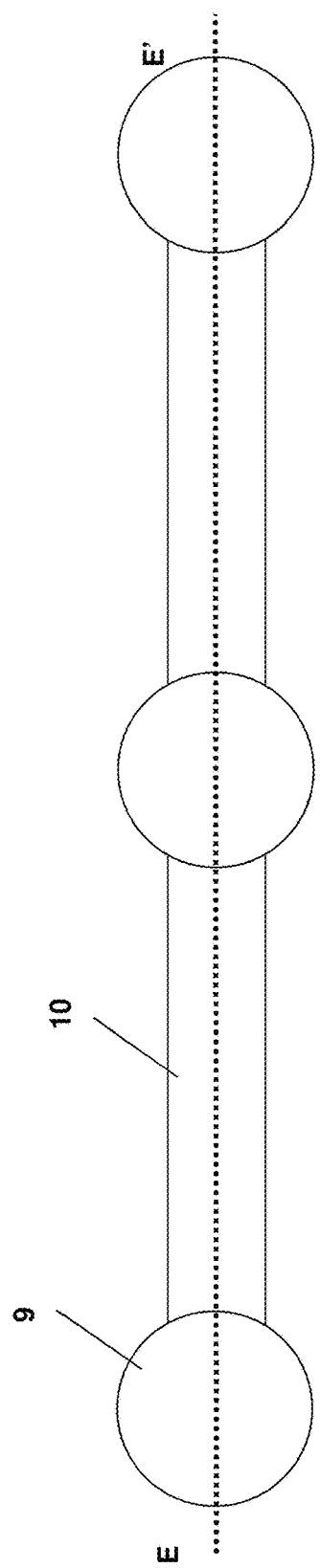
FIG. 5 is a simplified cross-sectional view of the net spacer of FIG. 3, according to embodiments of the present invention.

FIG. 5 is a simplified cross-sectional view of the net spacer of FIG. 3, according to embodiments of the present invention. FIG. 5 shows how the symmetry axes of cylindrical filaments 10 are on the same plane with the centers of nodes 9 along a symmetry plane depicted as line E-E', resulting in a symmetrical mesh. However, achieving a perfect symmetry (i.e., axes and centers of symmetry on exactly the same plane) is not necessary for spacer production. In such a configuration, the spacers only contact the membranes at contact points (or narrow circular areas), not along contact lines which are undesirable as with conventional spacers.

In one embodiment of the present invention, the net-type pattern is formed of equilateral squares, with a distance between centers of neighboring nodes 9≥~6 mm and a ratio of diameters (i.e., H/D)≥~2.0. In such an embodiment, the spacer is arranged within the SWM module so that the main (axial) flow direction (e.g., feed flow 5 of FIG. 1) is along diagonal 11 of the unit parallelogram, shown in FIG. 4.

The geometric configuration of the net spacer shown in FIG. 3 results in the elimination of areas of reduced or zero flow when implemented in an SWM module. Such areas are the regions in which undesirable phenomena of increased CP and MF are encountered. Furthermore, in such a geometric configuration, flow constrictions between spacer filaments and membranes are doubled, compared with conventional spacer geometry. As described above, such regions of flow constriction have high shear stresses and mass-transfer coefficients due to locally-increased flow velocities. Such an increase in transport coefficients significantly benefit SWM-module performance regarding effectiveness and degree of separation (see Koutsou et al. cited above).

In the embodiments of FIGS. 3-5, typical values of the geometric parameters L, H, and β can be used. Previous studies using conventional spacer geometry (see Koutsou et al. cited above and Koutsou et al. in *Desalination and Water Treatment*, 18, 139-150 (2010)) show that with values of these parameters varying within certain ranges (e.g., L≈2.4-4.8 mm, H≈0.7-1.2 mm, and β≈60-120°, one can achieve almost optimum results regarding relatively high mass-transfer coefficients with an acceptable pressure drop within the filled flow channels. To attain the best SWM performance possible with the spacer configuration of FIGS. 3-5, it is possible to broaden the range of its parameter values, especially if other conditions or limitations (arising in the fabrication process of the SWM modules) so dictate, or if such conditions point in the direction of a broader range of spacer geometric parameters.

Figure 1:
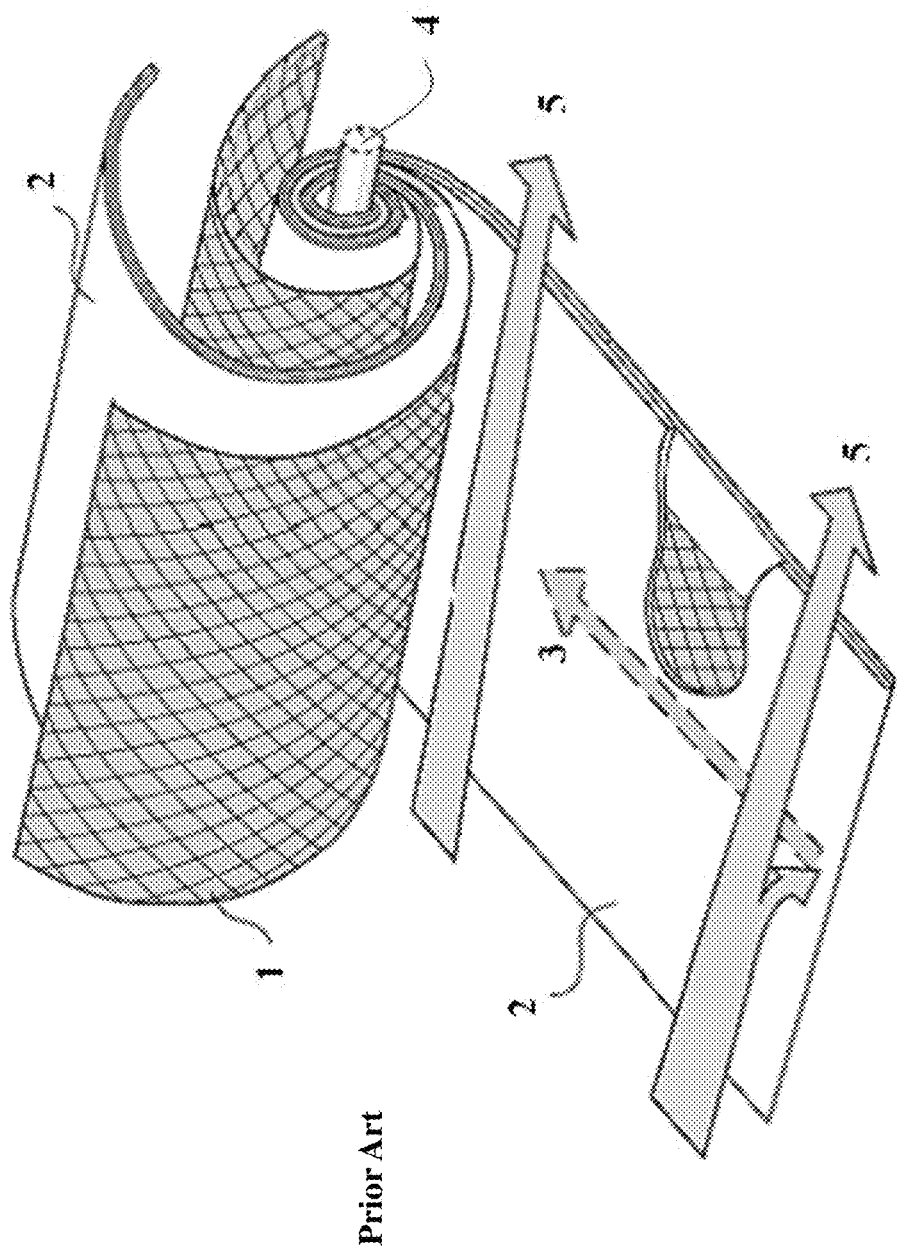
FIG. 1 is a simplified perspective diagram of a typical SWM module having a standard mesh-type spacer used in water desalination and membrane water treatment/separation, according to the prior art.
Figure 2:
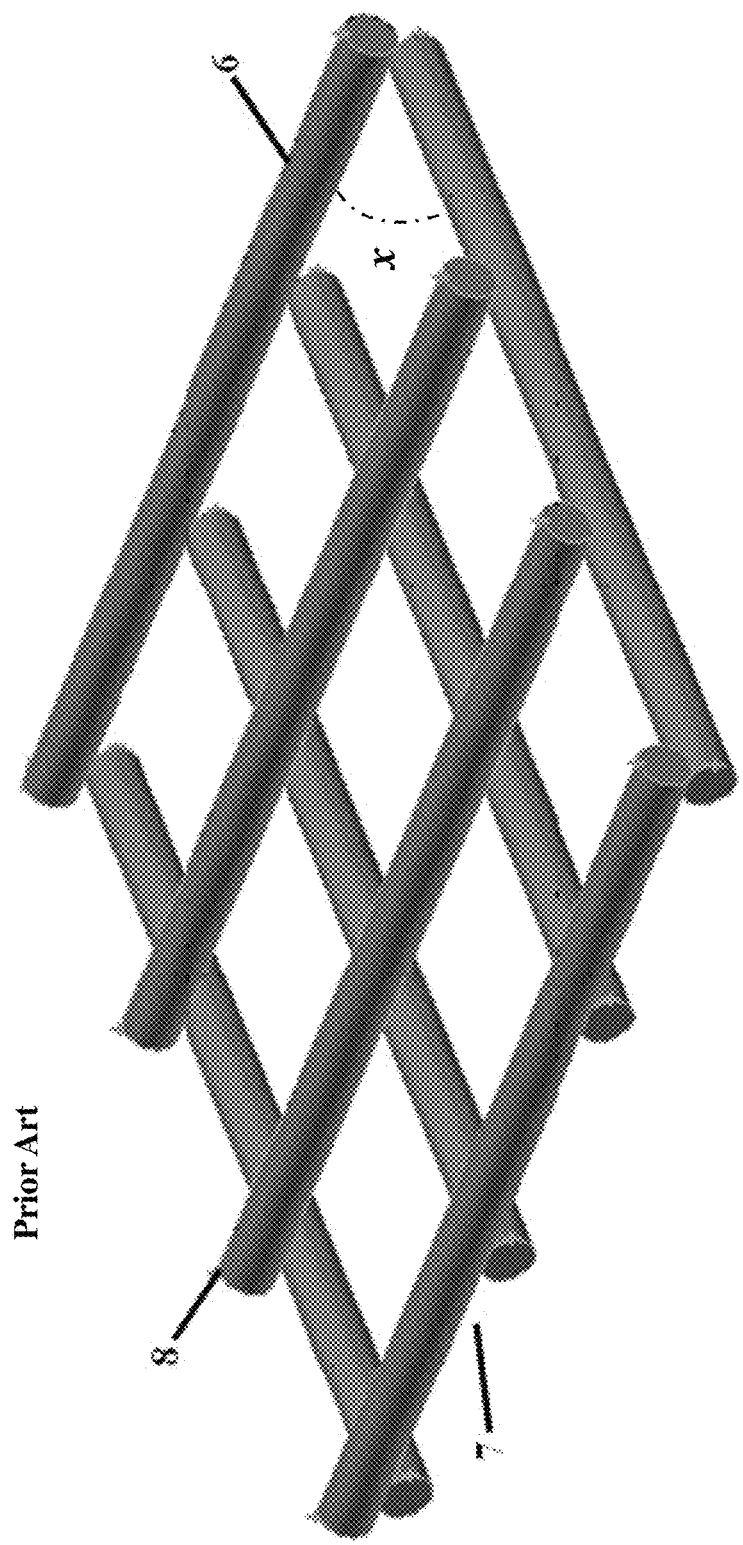
FIG. 2 is a simplified perspective diagram of a typical net-type spacer, according to the prior art.

The net spacer of FIGS. 3-5 can be incorporated as a feed-spacer sheet into standard SWM modules (such as depicted in FIG. 1). In such an assembly, the net spacer of FIG. 3 is employed in place of mesh-type spacer 1 of FIG. 1. Given that three sides/edges of membrane sheets 2 are closed (as described above with regard to FIG. 1), the combined sheet structure takes the form of an "envelope." In embodiments of the present invention, each envelope, formed from two membrane sheets, encloses a fabric-type insert, which allows flow of the permeate along transverse direction 3. A feed-spacer sheet, having the geometric configuration of FIG. 3, is placed between adjacent membrane envelopes, thus forming the flow channels for the fluid, which is fed for treatment in an axial flow direction (as in feed flow 5).

The desalinated or "clean fluid" of membrane permeate 3 flows toward central perforated tube 4 in a direction substantially normal to feed flow 5. As the feed fluid exits the SWM module along feed flow 5, the feed fluid is reduced in volume due to removal of clean or desalinated filtrate, and proportionately increases in the concentration of rejected salts and other undesirable species. Such a "concentrate" possesses an increased osmotic pressure compared to that of the initial feed-fluid.

Figure 6:
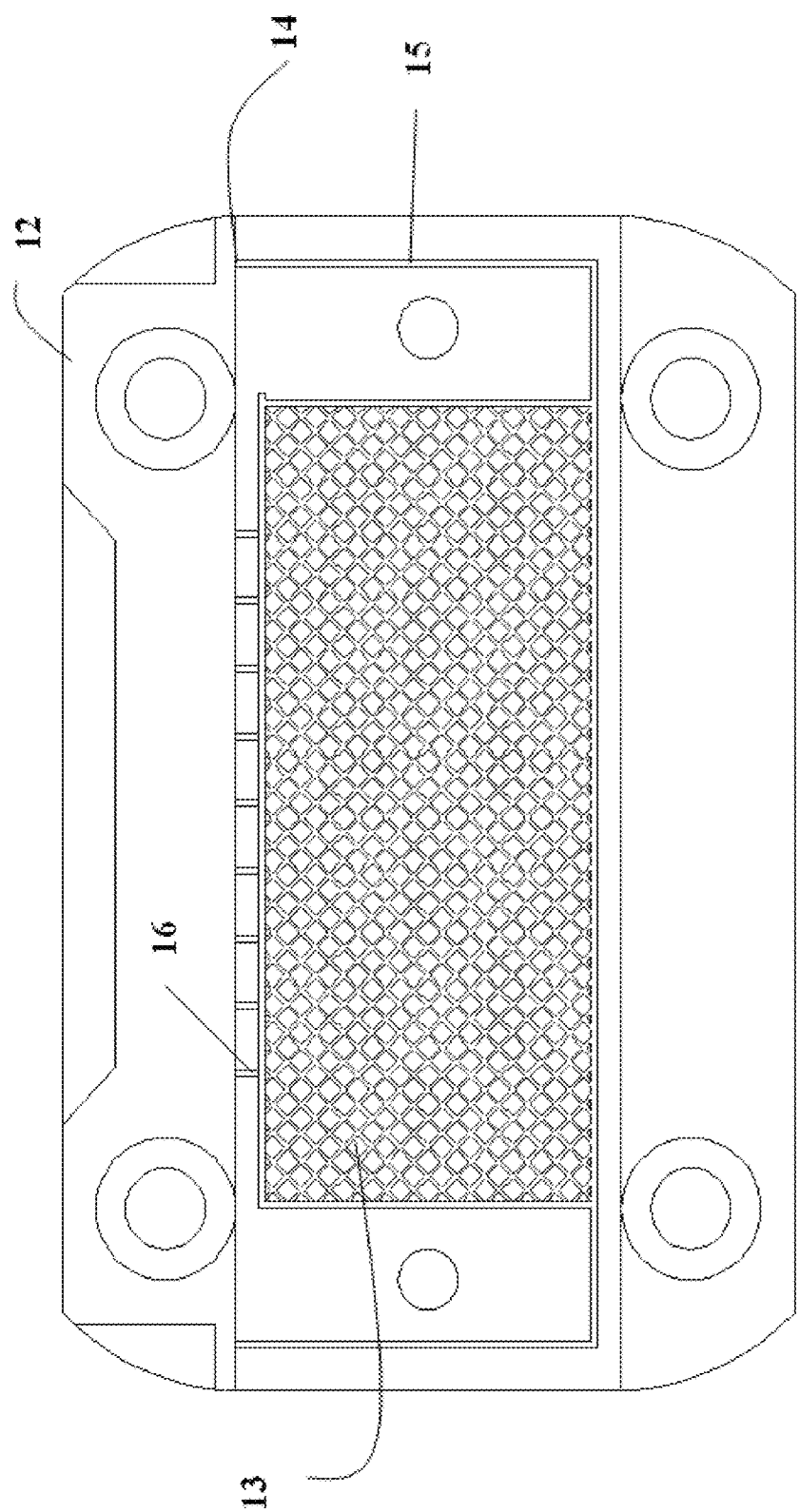
FIG. 6 is a simplified top view of a spacer fabrication mold, according to embodiments of the present invention.

FIG. 6 is a simplified top view of a spacer fabrication mold, according to embodiments of the present invention. The mold has two, practically-identical slabs 12 with very smooth surfaces in contact. On each surface of slabs 12 (which is essentially the plane of symmetry of the resulting net), narrow parallel channels are engraved having a semi-circular lateral cross-section (which, when filled with polymer melt or other appropriate material, essentially form half of the spacer net of FIG. 3 with respect to its planar symmetry plane 13). On the smooth surface of slabs 12, larger side channels 14 and 15 are engraved for facilitating the injection of polymer melt, and the filling of the engraved net during production. Additional side channels 16 are engrave to facilitate the removal of air during the injection process (particularly with regard to the filling of the small net channels with polymer melt), thus facilitating total filling of the engraved channels and nodes with material.

Figure 7:
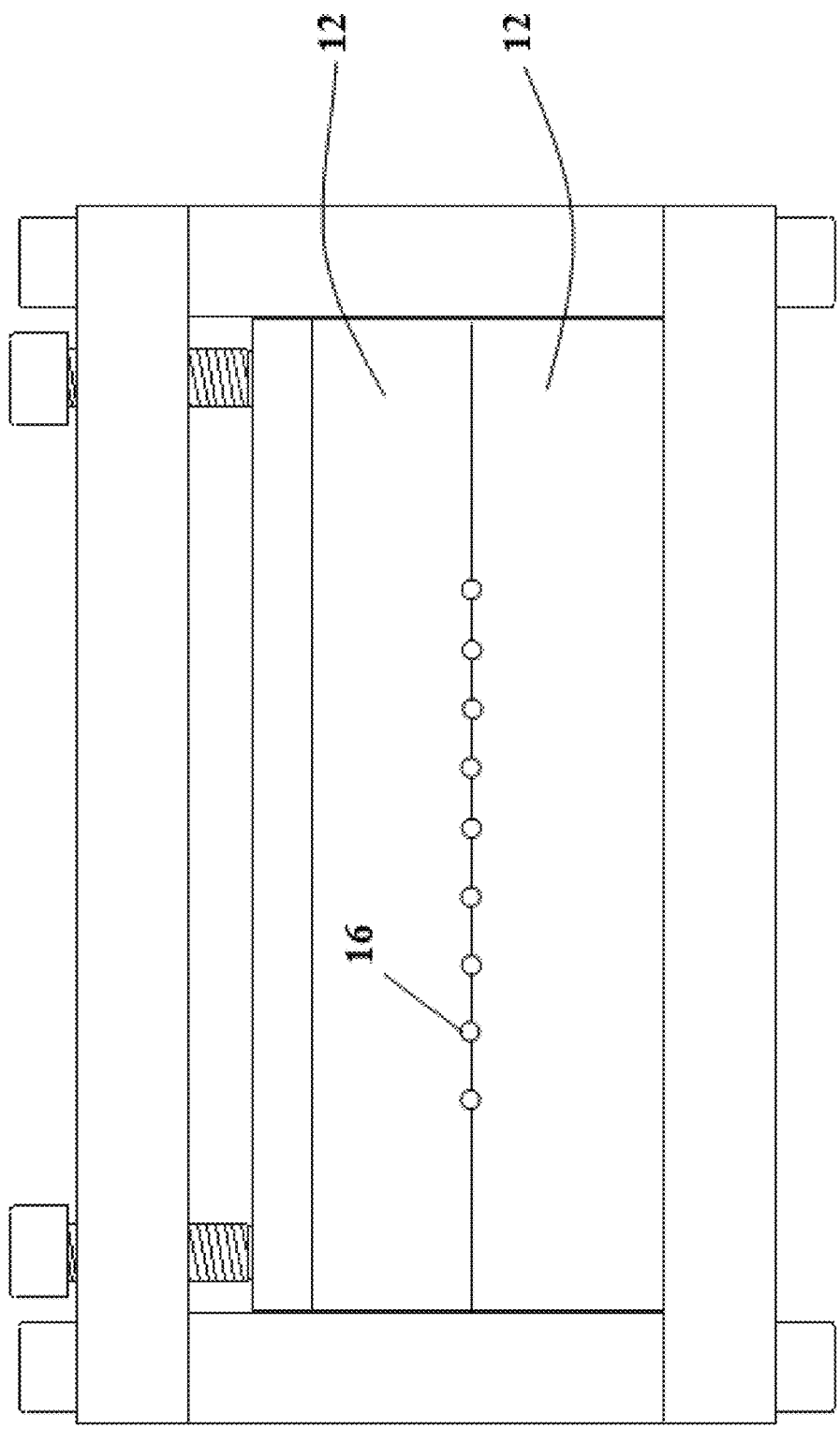
FIG. 7 is a simplified side view of a fitting assembly for spacer fabrication, according to embodiments of the present invention.

FIG. 7 is a simplified side view of a fitting assembly for spacer fabrication, according to embodiments of the present invention. The fitting assembly of FIG. 7 facilitates the precise assembly of slabs 12 of FIG. 6 under pressure. Side channels 16 are also shown in FIG. 7. The surface pattern of one of slabs 12 forms a minor image with the engraved pattern in the surface pattern of the other slab 12. Special fittings are embedded in appropriate locations of each slab 12 using known machining techniques. Depending on the size of the mold, an appropriate means of exerting pressure is employed (e.g., a hydraulic press) to ensure a tight fit that is leak-free. During melt injection, slabs 12 are maintained at an appropriate temperature, depending on the melting point and other relevant physicochemical properties of the injected material. After injection and filling the engraved net pattern with polymeric or other appropriate material, the mold is sufficiently cooled and disassembled after which the solidified net is removed.

Figure 8:
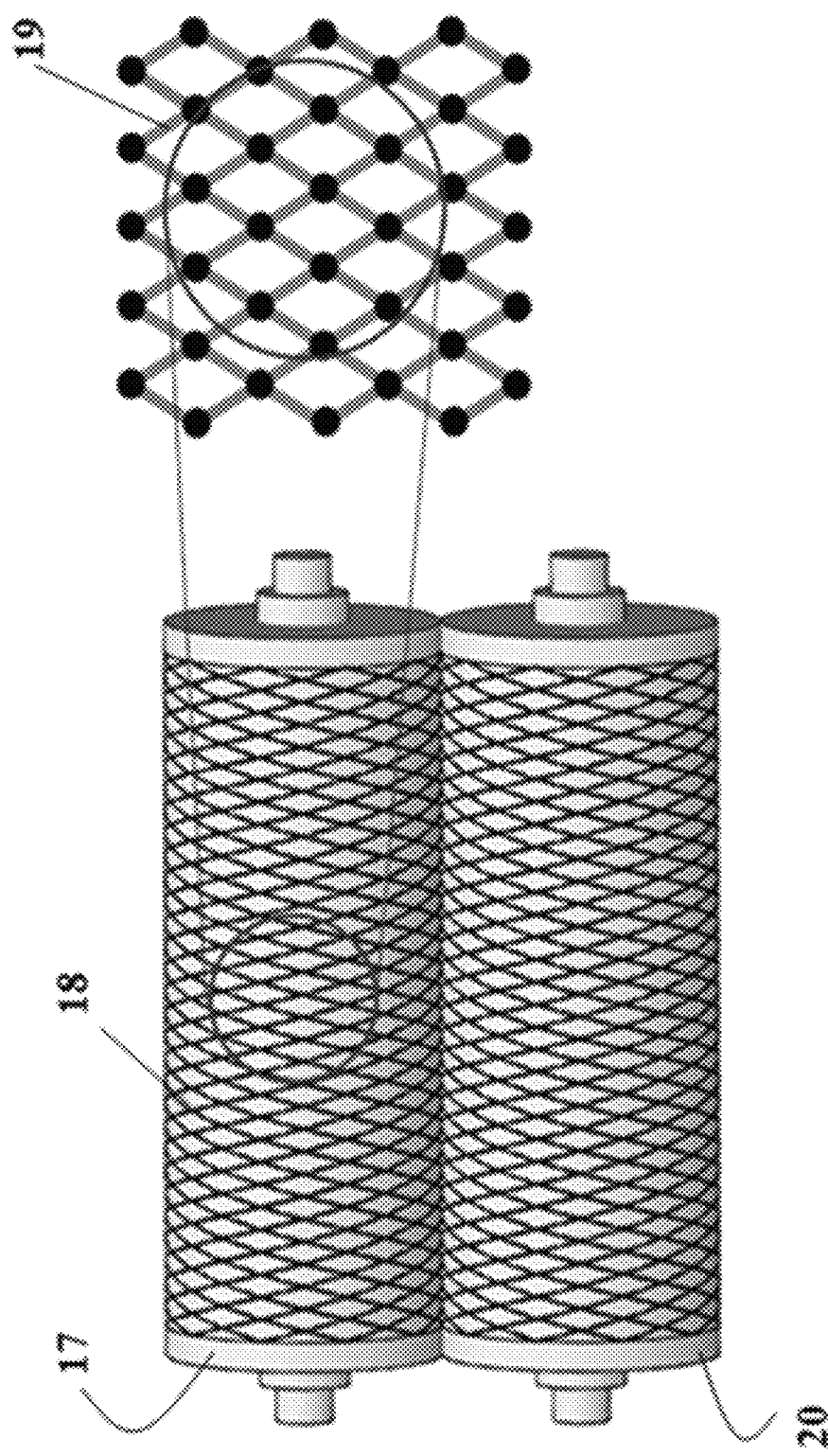
FIG. 8 is a simplified side view and enlarged sectional view of a spacer fabrication mold, according to alternative embodiments of the present invention.

FIG. 8 is a simplified side view and enlarged sectional view of a spacer fabrication mold, according to alternative embodiments of the present invention. Two cylinders 17 and 20 of the mold are shown having very smooth surfaces before engraving the pattern leading to fabrication of the net spacer. On the surface of cylinders 17 and 20, helical channels 18 of small width and semi-circular, lateral cross-section are engraved, which each correspond to half of the net structure. The two sets of channels 18 together form the geometric configuration of the net spacer of FIG. 3. Therefore, when the two cylinders are rotated at practically the same rotational speed in opposite directions toward their line of contact, a net spacer 19 is formed (corresponding to FIG. 3). Channels 18 have a semi-circular, lateral cross-sectional diameter D, which corresponds to half of connecting filaments 10 in FIG. 3 with respect to the main symmetry plane. Such parallel helical engravings on the surface of cylinders 17 and 20 are configured such that the projection of the engraved pattern on a plane surface forms parallel small channels (i.e., connecting filaments 10 of the spacer).

In some embodiments of the present invention, the distance between parallel filaments 10 is L, and is equal to the side of an equilateral square of the net. In other embodiments, it is possible for the engraved pattern to lead to formation of a net comprised of non-orthogonal parallelograms of various "crossing" angles 0 and length L (as shown in FIG. 4).

At a linear distance L along the small engraved channels, semi-spherical cavities are machined or formed which correspond to half the volume of nodes 9 of FIG. 3 with respect to the plane of symmetry depicted as line E-E' (as shown in FIG. 5). Such small channels and semi-spherical cavities are engraved on the surface of cylinders 17 and 20 in such a way that their projection on a flat plane comprises half of net spacer 19 with respect to its plane of symmetry. The angle formed in such a projection between the narrow channels and the generator of cylinders 17 and 20 equals the angle β/2 (as shown in FIG. 4) which is characteristic of the elementary unit parallelogram of the net spacer. Channels 18 in cylinders 17 and 20 are virtually identical with regard to the distance of the parallel small channels and distance L between the centers of the semi-spherical cavities along each cylinder's channels 18.

Cylinders 17 and 20 are assembled on a special metal frame with the necessary precision such that their axes of symmetry are parallel (normal with respect to the direction of the gravitational field), and are in contact along their surface generator (i.e., a line parallel to their axes). Moreover, their relative position (with respect to engraved channels 18 and cavities) is precisely adjusted so that net spacer 19 is produced when these small channels and cavities are filled with polymer melt upon the cylinders' rotation.

Figure 9:
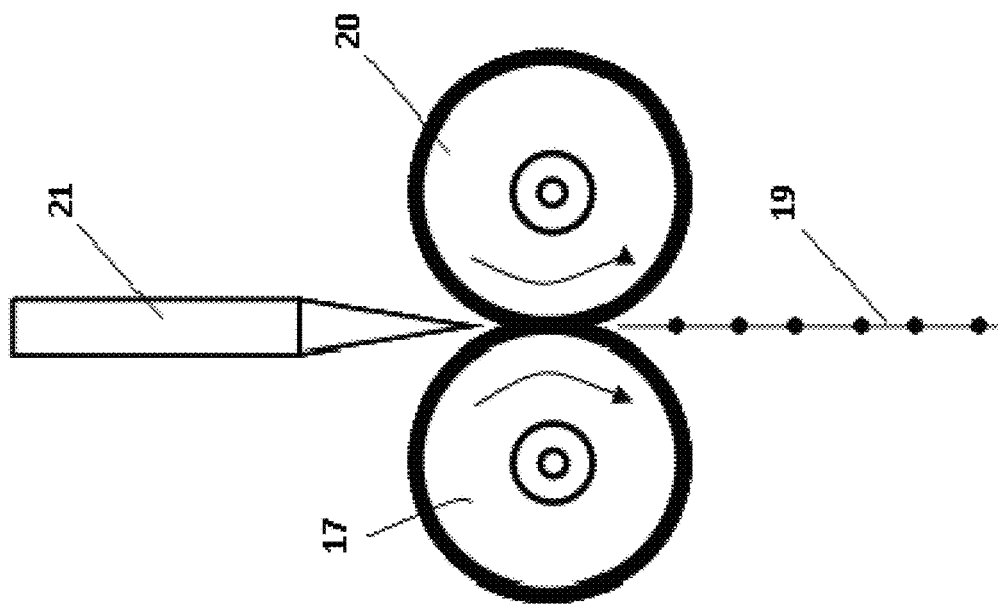
FIG. 9 is a simplified end view of the spacer fabrication mold of FIG. 8 with the melt feed, according to embodiments of the present invention.

FIG. 9 is a simplified end view of the spacer fabrication mold of FIG. 8 with the melt feed, according to embodiments of the present invention. Cylinders 17 and 20 are rotated at the same rotational speed and in opposite directions toward their line of contact, while molten polymer is provided by a special feeding device 21 at a controlled rate along the contact line of rotating cylinders 17 and 20. Such operation enables engraved channels 18 of FIG. 8 to fill with polymer melt, resulting in net spacer 19 being formed. Upon exiting counter-rotating cylinders 17 and 20, net spacer 19 is sufficiently cooled to be solidified, and subjected to controlled tension. Net spacer 19 can then be rolled around a reel in order to form a final marketable product.

EXAMPLES

The following examples show that the novel spacer geometric configuration depicted in FIGS. 3-5 leads to improved SWM-module performance in comparison to that of conventional spacers. In these examples, basic geometrical parameter values are used which are defined with regard to FIGS. 3-5. For the purpose of comparison, the distribution of the flow shear-stresses on the membranes is presented, which is an important feature of membrane operation. In general, increased values of shear stresses are associated with improved performance of SWM modules (see Koutsou et al. cited above).

Figure 10:
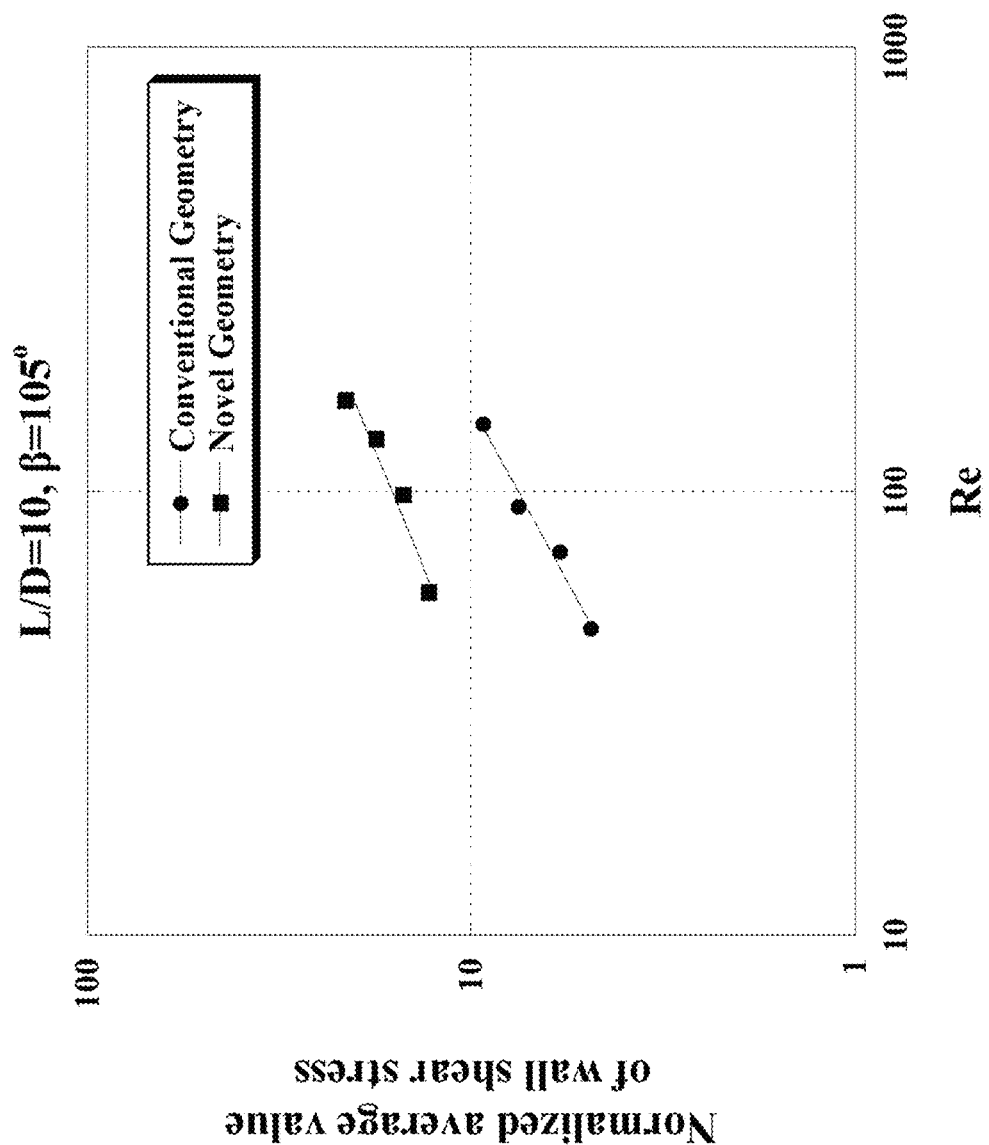
FIG. 10 is a graph depicting the computed flow shear-stresses on membrane surfaces employing the net spacer of FIG. 3 with a β-value of 105°, according to embodiments of the present invention.
Figure 11:
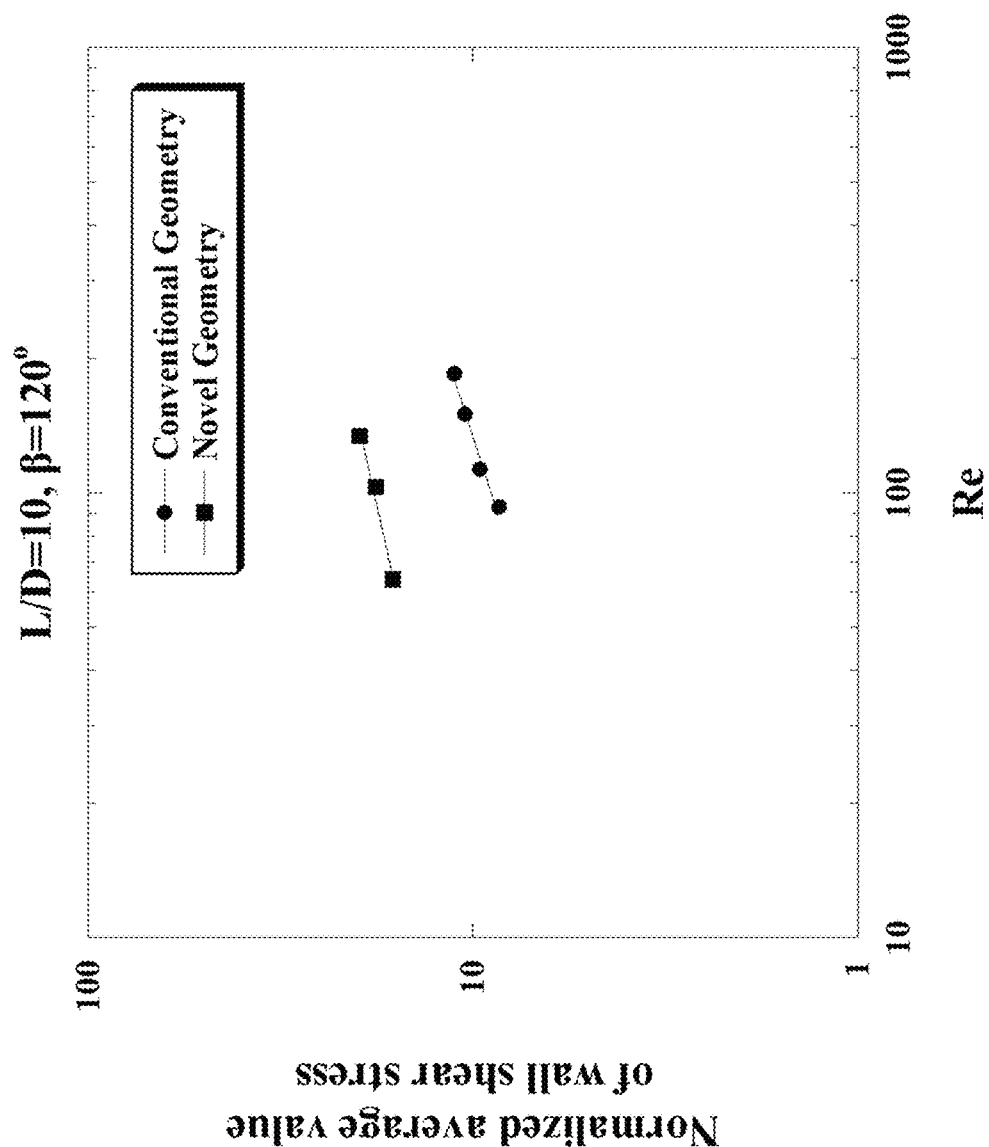
FIG. 11 is a graph depicting the computed flow shear-stresses on membrane surfaces employing the net spacer of FIG. 3 with a β-value of 120°, according to embodiments of the present invention.

FIG. 10 is a graph depicting the computed flow shear-stresses on membrane surfaces employing the net spacer of FIG. 3 with a β-value of 105°, according to embodiments of the present invention. FIG. 11 is a graph depicting the computed flow shear-stresses on membrane surfaces employing the net spacer of FIG. 3 with a β-value of 120°, according to embodiments of the present invention. The computed flow shear-stresses (see Koutsou et al. cited above) in FIGS. 10 and 11 correspond to common spacer geometry (labeled "conventional geometry") in comparison to the spacer geometry of FIG. 3 (labeled "novel geometry"). In both FIGS. 10 and 11, the ratio of distance L between nodes 9 over diameter D of connecting filaments 10 (shown in FIG. 4) is the same (i.e., L/D=10); whereas, the "crossing" angle β equals 105° in the data of FIGS. 10 and 120° in the data of FIG. 11.

The range of Reynolds numbers in the results of FIG. 10 corresponds to the superficial velocity range employed in practice (i.e., ~10-30 cm/s). In both data sets (conventional and novel geometry) of FIG. 10, the ratio of the distance between the center of neighboring nodes over the nominal diameter of filaments D is L/D=10; whereas, their crossing angle is β=105°. The main flow direction is parallel to the line bisecting the β angle. The shear stresses induced by the novel geometry are increased by approximately 50%. Such an increase demonstrates the potential for improvement of SWM-module performance when the novel geometry is employed because the increased shear stresses tend to mitigate the undesirable phenomena of CP and MF.

In both data sets (conventional and novel geometry) of FIG. 11, the ratio of the distance between the center of neighboring nodes over the nominal diameter of filaments D is L/D=10; whereas, their crossing angle is β=120°. Again, as with FIG. 10, the main flow direction is along the line bisecting the β angle. FIG. 11 shows that the shear stresses induced when the flow channels are filled with the novel geometry are increased by approximately 50% with the expected significant improvement in SWM-module performance due to the mitigation of effects related to CP and MF.

While the present invention has been described with respect to a limited number of embodiments, it will be appreciated that many variations, modifications, and other applications of the present invention may be made.

What is claimed is:

1. A spiral-wound membrane (SWM) module, the SWM module comprising:
   (a) a central tube having perforations along its length for collecting a permeate;
   (b) at least two filtration envelopes, each said filtration envelope having two membrane sheets and a porous, fabric-type insert in between said two membrane sheets for facilitating said permeate to flow, wherein each said envelope is closed along three edges of said two membrane sheets, and wherein each said envelope is configured to allow said permeate to exit from a fourth, open edge attached to said central tube; and
   (c) a respective feed-spacer sheet in planar contact with an outer membrane surface of a respective said filtration envelope;
   wherein said respective feed-spacer sheet is in the form of a single-layer net having nodes symmetrically distributed in said net such that node centers of said nodes are on a common plane which is defined as forming a single layer, said common plane being the planar plane of symmetry of said respective feed-spacer sheet, and neighboring centers of four nearest nodes form apices of a parallelogram, and wherein all said nodes are connected by flexible segments such that said net forms a regular planar net, wherein symmetry axes of said flexible segments are on the same plane as the plane of said nodes, wherein said net is symmetric in relation to the planar plane of symmetry of said respective feed-spacer sheet, wherein a ratio of a mean node diameter of said nodes over a mean segment diameter of said flexible segments varies between 1.5 and 5.0, and wherein a symmetric gap, on either side of said flexible segments, between said flexible segments and each of said two membrane sheets varies between 0.167 of said mean node diameter and 0.4 of said mean node diameter.

2. The SWM module of claim 1, wherein said respective feed-spacer sheet is positioned in between two adjacent said filtration envelopes, thereby forming a feed-flow channel such that a main feed-flow direction is along a bisector of said parallelogram.

3. The SWM module of claim 1, wherein an angle, defined by the intersection of symmetry axes of two neighboring said flexible segments of said feed-spacer sheet, varies between about 30° and 150°.

4. The SWM module of claim 3, wherein said angle has an angle bisector coinciding with a main feed-flow direction.

5. The SWM module of claim 1, wherein a node shape of said nodes is approximately spherical or oblate spheroidal.

6. The SWM module of claim 1, wherein a segment shape of said flexible segments is such that their cross-section is approximately circular or elliptical.

7. The SWM module of claim 1, wherein a ratio of the distance between said node centers over a mean segment diameter of said flexible segments varies between about 5 and 14.

8. The SWM module of claim 1, wherein a ratio of a mean node diameter of said nodes over a mean segment diameter of said flexible segments is equal to about two, and wherein symmetry axes of said flexible segments and of said node centers of said nodes lie substantially on said common plane such that said net is symmetric.

* * * * *